United States Patent

Gschossmann et al.

[11] Patent Number: 5,606,252
[45] Date of Patent: Feb. 25, 1997

[54] CIRCUIT FOR MOOTING BROKEN OR CHIPPED TEETH OF ENCODER WHEELS VIA COMPARING TEMPORAL FLUCTUATIONS BETWEEN RISING OR FALLING EDGES AND USING EDGE WITH LEAST FLUCTUATION

[75] Inventors: Günther Gschossmann, Mühldorf; Peter M. Bielig, München, all of Germany

[73] Assignee: Knorr-Bremse System fur Nutzfahrzeuge GmbH, Munich, Germany

[21] Appl. No.: 450,807

[22] Filed: May 25, 1995

[30] Foreign Application Priority Data

May 26, 1994 [DE] Germany ............ 44 18 424.7

[51] Int. Cl.$^6$ ............... G01P 3/48; G01P 3/54; G01P 3/52; G01N 27/72
[52] U.S. Cl. ............ 324/166; 324/168; 324/225; 364/565
[58] Field of Search ............ 364/565; 327/263; 310/168, 155; 324/160, 166, 173, 174, 207.25, 167, 168, 207.12, 225

[56] References Cited

U.S. PATENT DOCUMENTS

| | | | |
|---|---|---|---|
| 4,358,828 | 11/1982 | Reid et al. | 324/166 |
| 4,580,047 | 4/1986 | Sasaki et al. | 324/173 X |
| 4,908,572 | 3/1990 | Sakai et al. | 324/173 |
| 4,928,045 | 5/1990 | Doemen | 324/166 X |
| 5,063,344 | 11/1991 | Linke | 324/144 X |
| 5,066,910 | 11/1991 | Sugiyama | 324/166 |
| 5,357,196 | 10/1994 | Ito | 324/166 |
| 5,371,460 | 12/1994 | Coffman et al. | 324/165 |

FOREIGN PATENT DOCUMENTS

| | | |
|---|---|---|
| 0359422 | 3/1990 | European Pat. Off. |
| 0373131 | 6/1990 | European Pat. Off. |
| 3743958 | 12/1987 | Germany |
| 3824713 | 7/1988 | Germany |
| 3719439 | 12/1988 | Germany |
| 4138370 | 5/1992 | Japan |

OTHER PUBLICATIONS

Wood, Sr., Digital Speed Detection, IBM Technical Disclosure Bulletin, vol. 15, No. 10, Mar., 1973, pp. 3187–3189.

Primary Examiner—Sandra L. O'Shea
Assistant Examiner—Roger C. Phillips
Attorney, Agent, or Firm—Senniger, Powers, Leavitt & Roedel

[57] ABSTRACT

A method and a device for detecting rotational speed with an inductive sensor in which a sinusoidal potential is induced by a magnet wheel and then fed to a filter with a comparator connected downstream of the filter and therefrom into a square-wave signal that is essentially proportional to the rotational speed of the magnet wheel. This output signal of the comparator is evaluated in a microcomputer. In this evaluation, only the same type of edges of the comparator signal are evaluated, specifically those in which the intervals fluctuate less when considered over a certain time span. The microcomputer here can initially evaluate both types of edges, that is, positive and negative edges, and then use those edges in which smaller fluctuations, that is, interference, are determined for calculating the rotational speed. The microcomputer can also first evaluate only one type of edges and change over to edges of the other type only if the former displays interference above a present value. If the edges of the other type show even greater interference than those of the first type, then the system switches back to the first type. The changeover can be done either in the microcomputer or externally. The external changeover to the type of edge can be done by an external inverter or by reversing the polarity of the sensor output signals by means of a controllable switch.

22 Claims, 5 Drawing Sheets

CIRCUIT FOR MOOTING BROKEN OR CHIPPED TEETH OF ENCODER WHEELS VIA COMPARING TEMPORAL FLUCTUATIONS BETWEEN RISING OR FALLING EDGES AND USING EDGE WITH LEAST FLUCTUATION

BACKGROUND OF THE INVENTION

The invention is related to a process and a device for detection of rotational speed of a rotating part using a magnet wheel connected to the rotating part.

For detecting the rotational speed of vehicle tires or other rotating parts, it is customary to attach to the rotating part a so-called magnet wheel which turns along with that part and has projecting teeth on its outer periphery that are distributed equidistantly around that periphery of the magnet wheel. An inductive sensor arranged near the outer periphery of the magnet wheel responds to changes of a magnetic field produced by it and produces in the ideal case a sinusoidal alternating current. The changes in the magnetic field are generated by the teeth and teeth gaps passing alternately through the sensor magnetic field. The frequency of this alternating current is proportional to the rotational speed of the rotating part. Such sensors are employed, for instance, to detect the wheel rotation speed of vehicles that are equipped with an antilocking or drive slippage controller.

Because of manufacturing tolerances, damage or contamination of the magnet wheel, the form of the alternating current produced by the inductive sensor frequently deviates in practice from the sinusoidal profile, which leads to inaccuracies in evaluating the signal represented by this alternating current. For instance, errors in the detected rotational speed will appear in use in conjunction with antilocking brake systems, which can then lead to a deterioration of the antilocking control.

In known devices the alternating current emitted by the inductive sensor is fed to a comparator, the square-wave output signal of which then likewise has interference. It was attempted to solve this problem by filtering the sensor signal, which is only possible to a limited extent, however, since the interference signals that appear usually lie in the same frequency range as the useful signal.

SUMMARY OF THE INVENTION

The object of the invention is to improve a process and device of the type initially mentioned in such a way that the measuring accuracy is raised, specifically in case of an interference-laden output signal of the inductive sensor. This problem is solved for the process and for the device by the characteristics listed in the claims. Advantageous configurations and refinements of the invention are to be found in the subordinate claims.

Briefly, therefore, the invention is directed to a process for detecting the rotational speed of a rotating part. A magnet wheel connected to the rotating part is sensed with a sensor which produces an essentially sinusoidal output signal. The sinusoidal output signal is converted into a square-wave signal having first edges of a first type and second edges of a second type. A rotating part speed signal is generated based on the edges of the square-wave signal of one type only of the first and second types, the temporal intervals of which fluctuate by less than a predetermined fluctuation target value during a predetermined time span.

The invention is also directed to a process for detecting the rotational speed of rotating parts in which a sensor senses a magnet wheel connected to the rotating part and produces an essentially sinusoidal output signal which is, if desired, filtered and converted into a square-wave signal, with the square-wave signal being evaluated and a signal corresponding to the rotational speed to be determined being generated. In determining the rotational speed only edges of the same type from the square-wave signal are used, the temporal intervals of which edges fluctuate by less than a prescribed amount during a predetermined time span.

The invention is also directed to a device for detecting the rotational speed of rotating parts, particularly vehicle wheels, having a magnet wheel connected to the rotating part, a sensor sensing the magnet wheel and producing a sinusoidal output signal, a comparator that is connected downstream from the sensor and generates a square-wave output signal having a first type of edges and a second type of edges opposite to the first type of edges, and a microcomputer that evaluates the square-wave output signal of the comparator. The improvement in the device is an evaluation logic unit for the microcomputer which detects temporal intervals between edges of the first type in the square-wave output signal from the comparator and a changeover unit which feeds the second type of edges from the square-wave signal for evaluation if the temporal intervals of the first type of edges fluctuate during a predetermined time span by more than a predetermined amount.

Finally, the invention is directed to a device for detecting the rotational speed of a rotating part. The device has a sensor sensing the rotation of the part and producing a sinusoidal output signal, a comparator that is connected downstream from the sensor and generates a square-wave output signal having a first type of edges and a second type of edges opposite to the first type of edges, and a microcomputer that evaluates the square-wave output signal of the comparator. The device further comprises an evaluation logic unit for the microcomputer which detects temporal intervals between edges of the first type in the square-wave output signal from the comparator and a changeover unit which feeds the second type of edges from the square-wave signal to the microcomputer for evaluation if the temporal intervals of the first type of edges fluctuate during a predetermined time span by more than a predetermined amount.

Other objects and features of the invention will be in part apparent and in part pointed out hereinafter.

BRIEF DESCRIPTION OF THE DRAWINGS

The invention is described in greater detail below on the basis of embodiment examples in connection with the drawings. These show.

Identical reference numerals in the individual figures identify similar or functionally corresponding components.

DETAILED DESCRIPTION OF THE INVENTION

The invention starts from the recognition that, for certain faults in the magnet wheel (faults, for instance in the tooth height of the magnet wheel), the output signal of the comparator is interfered with in the sense that at a constant rotational speed the temporal interval between positive edges changes but not the interval between negative edges (or vice versa). This is to be explained in greater detail below in conjunction with FIG. 5. The lowermost figure shows three teeth in a developed view of a magnet wheel for the two cases of a correct tooth height Z1 and an erroneous tooth height Z2, smaller for the middle tooth in this case. In the figure immediately above that, the profile of the alternating current of the inductive sensor at constant rotational speed is shown, with the curve S1 referring to the correct tooth height and supposed to have to have the ideal sinusoidal form here. It is recognizable that the zero crossing points of the signal S1 are pointed in each case directly at the middle of the tooth or tooth gap. If this sinusoidal signal is converted to a square-wave signal in a comparator, then the uppermost curve K1 results. In the case of a tooth height fault, as shown at Z2 in the lowermost diagram in FIG. 5, then the curve profile S2 results and, from it, the comparator signal K2. The form of signal S2 deviates considerably from the ideal sine wave. It can be recognized, however, that the zero crossing points of signal S2, when it moves from positive to negative values (cf. the dashed vertical lines), agree with those of signal S1. Accordingly the negative edges of the comparator signal K2 coincide with the negative edges of the comparator K1. Negative edges are defined here to be jumps of the signals K1 and K2 from the high level to the low level.

The positive edges (cf. the dotted vertical lines), by contrast, are shifted in phase for the faulty tooth, so that an evaluation which uses the period of the comparator signal K2 from positive edge to the next positive edge (T21p, T22p and T23p) would be erroneous, since the period T22p is too short and the periods T21p and T23p are too long. The negative edges of the faulty tooth Z2, by contrast, are correct; that is, the periods T21n and T22n measured from one negative edge of signal K2 to the subsequent negative edge are equally long and also equally as long the periods T11, T12 and T13 of the fault-free tooth Z1.

Figure 5:
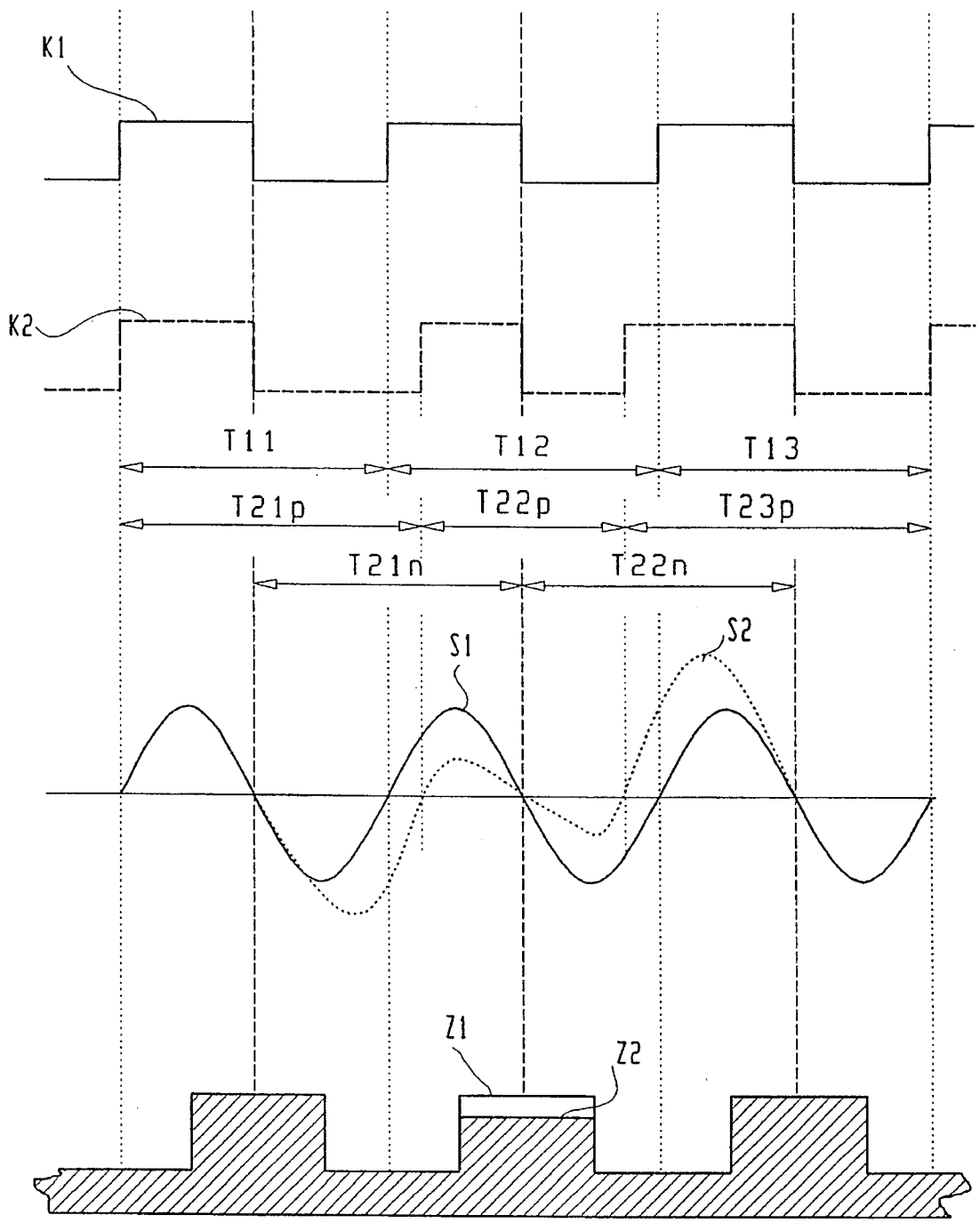
FIG. 5: diagram of various curve profiles of output signals of an inductive sensor and of output signals of a comparator and a developed view of a section of a magnet wheel, for a fault-free and a faulty case, respectively.

Proceeding from the knowledge above, the invention is based on the principle of drawing for rotational speed determination on those edges of the comparator signal of equal sign whose intervals vary less on average. In the example of FIG. 5, the intervals of the negative edges, that is, the periods T21n and T22n, are equal and are therefore used for determining the rotational speed. The intervals of the positive edge of signal K2, that is, the periods T21p, T22p and T23p, vary relatively strongly and would corrupt the signal.

Applying this fundamental concept, the fundamental principle of the device according to the invention lies in alternatively changing over an evaluation logic unit so that it responds to the either negative or positive edges of the comparator signal, with the changeover being done as a function of how uniformly the positive or negative edges are distributed. This can be implemented in various ways. An evaluation logic unit can initially evaluate only edges of the one type (positive edges, for instance) and, in case irregular intervals are determined, change over experimentally to an evaluation of the other edges (for instance, the negative edges) and then activate that type of evaluation logic unit which shows better, i.e., more regular, results. In another variant, evaluation logic units are activated simultaneously for the positive and negative edges, with that which shows the better result being definitively evaluated.

In another variant, the evaluation logic unit has only provisions for the evaluation of one type of edges, for instance, positive edges. A changeover to the other type of edges is accomplished by activating an inverter that changes the type of edge.

According to an additional variant, an evaluation of only one type of edges (positive edges, for instance) is also provided. A change to the other type of edges is done by controlled pole reversal of the output signal of the comparator.

Figure 1:
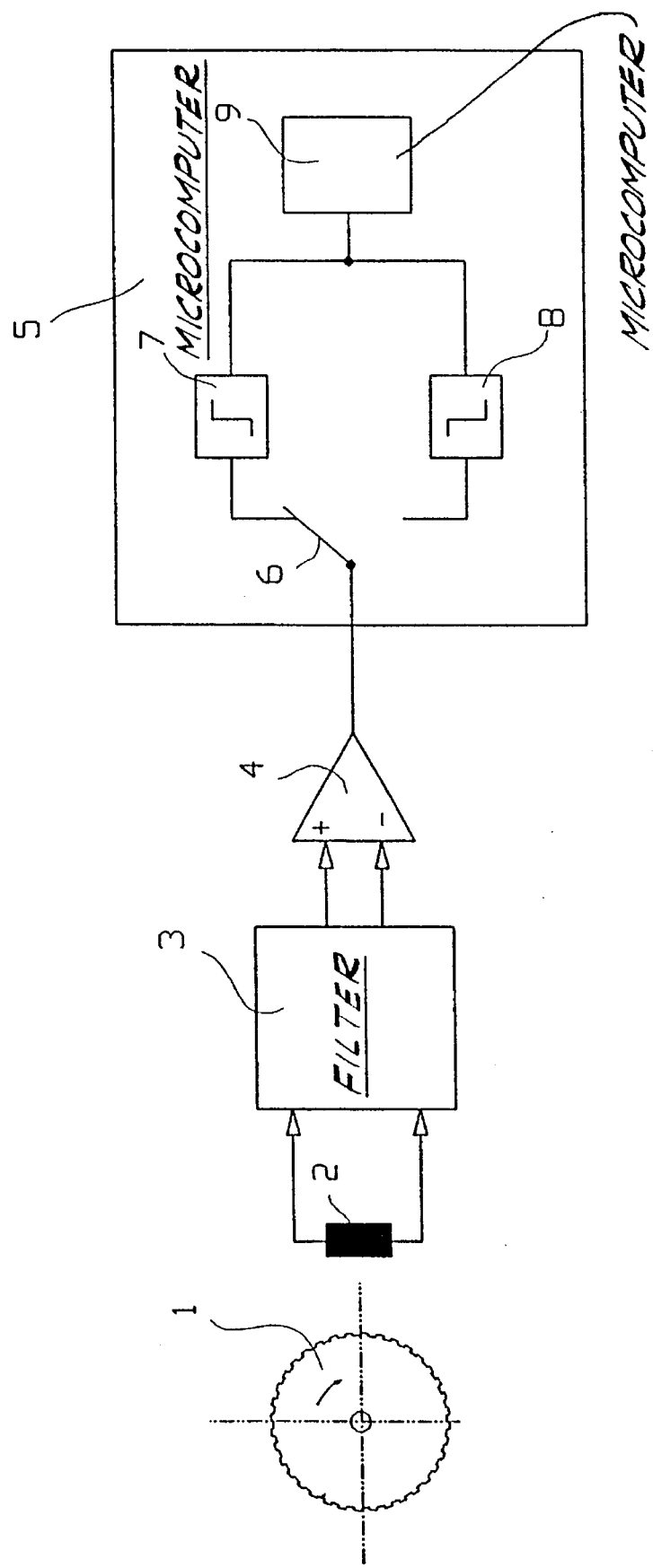
FIG. 1: schematic circuit diagram of a device for detecting rotational speed according to a first embodiment example of the invention.

Reference will be made first to FIG. 1. A magnet wheel 1 is connected to the rotating part of which the rotational speed is to be measured. This magnet wheel has a number of projecting teeth on its outer periphery which have, as much as possible, identical shapes and dimensions and are arranged distributed as evenly and exactly as possible around the outer periphery of the magnet wheel 1. An inductive sensor 2 that produces a roughly sinusoidal signal (S1 or S2 in FIG. 5) upon rotation of the magnet wheel 1 is arranged near the outer periphery of the magnet wheel. This signal is fed to a filter 3 which is designed as a low-pass or bandpass filter and filters out interference frequencies lying outside the expected range of rotational speed. The output signal of the filter 3 is fed to a comparator 4, which forms a square-wave signal (K1 or K2 in FIG. 5) from the filtered sinusoidal signal. The output signal of the comparator 4 is fed to a microcomputer 5 and evaluated there, in order ultimately to form an output signal that corresponds in digital or analog form as exactly as possible to the rotational speed of the magnet wheel 1.

In the embodiment example of FIG. 1 the microcomputer 5 contains a switch 6, which can of course be constructed as an electronic switch and feeds the output signals of the comparator 4 either to a first evaluation logic unit 7 or a second evaluation logic unit 8. These two evaluation logic units 7 and 8 are distinguished from one another in that one of them responds to positive edges of the output signal of comparator 4 and the other to negative edges. A positive edge is defined here to be a jump of the output signal of comparator 4 rising from low level to high level, while a negative edge is a jump from high level to low level. The output signals of both evaluation logic units 7 and 8 are fed to a rotational speed calculation logic unit 9.

The microcomputer 5 operates in the following manner: at the start of an evaluation the switch 6 is in a position, that shown, for instance, in which the output of the comparator 4 is connected to the evaluation logic unit 7 which responds to positive edges. For a prescribed time period, the signals arriving there are evaluated, perhaps in the form of measuring the duration between two successive positive edges, that is, for instance, the periods T11, T12 and T13. For example, a high-frequency counter is started at the beginning of period T11, the count of which at the end of period T11 is a measure for the temporal length of the period T11. The microcomputer 9 then evaluates whether these counting results of successive measurements deviate and, in particular, whether fluctuations in both directions can be ascertained, that is, whether the difference of the measurement results of successive measurements has a frequent change of sign, as well as whether this difference is based on fluctuations of greater absolute value. After the expiration of the prescribed time duration, the switch 6 is changed over and the evaluation logic unit 8 conducts the appropriate measurements or evaluations on the negative edges. Subsequently, the rotational speed calculation logic unit compares the evaluations of the two evaluation logic units 7 and 8 such that the evaluation logic unit 7 or 8 in which the smaller fluctuations appeared remains connected for subsequent measurements.

This event can occur once or when a vehicle is started. It can also be conducted on a running basis, however, which is practical for the case in which the magnet wheel has at least two faulty points which affect the comparator signal in opposing manners.

Figure 2:
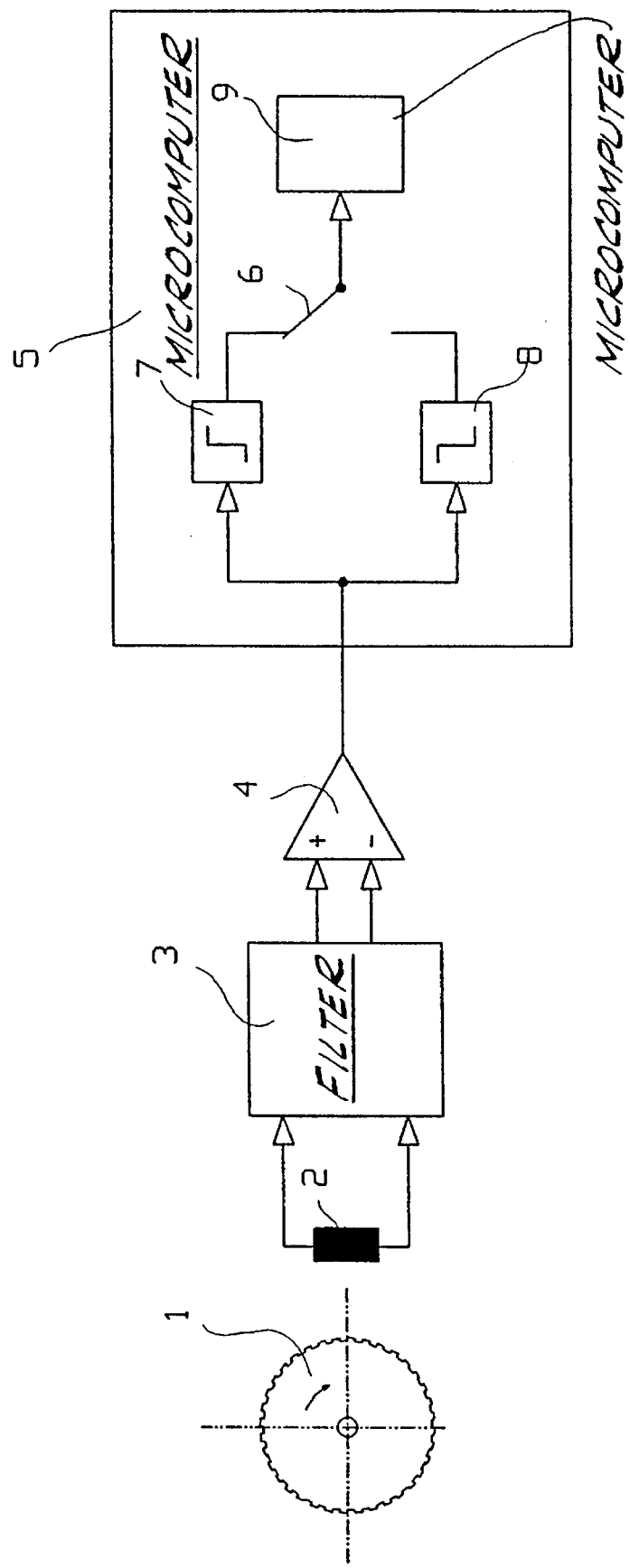
FIG. 2: schematic circuit diagram of a device for detecting rotational speed according to a second embodiment example of the invention.

The embodiment example of FIG. 2 is distinguished from that of FIG. 1 essentially in that the output signal of the comparator 4 is continuously fed to both evaluation logic unit 7 and unit 8, which thus operate continuously in parallel. The outputs of evaluation logic units 7 and 8 are alternatively fed to the rotational speed calculation logic unit 9 through the switch 6.

Here, as in the embodiment example of FIG. 1, two operating modes are possible. In a first operating mode, one of the two evaluation logic units 7 and 8 is selected by the switch 6. Only if this evaluation logic unit yields fluctuations that indicate a fault of the magnet wheel is there a changeover to the other evaluation logic unit. Then this other evaluation logic unit is tested for its fault indication. If the errors of this second evaluation logic unit are larger than those of the first evaluation logic unit, then the system switches back to the first evaluation logic unit; otherwise, the second evaluation logic unit remains in effect.

In the second operating mode, as illustrated in connection with FIG. 1, the evaluation is performed by both evaluation logic units upon starting of the vehicle or, in more general terms, at the beginning of measurement, either in series or in parallel, and, subsequently, that logic which brought the best results is selected.

In the one case, less computer power is required. In the other case, one obtains an optimization of the precision of the measurement results with greater computer power. In the first operating mode mentioned, one will provide an error tolerance threshold and change over to the other evaluation logic unit only if the one evaluation logic unit indicates errors that are larger than a set value.

It should be pointed out in this context that in practice the two evaluation logic units 7 and 8 are not necessarily separate component groups, but are implemented instead in a programmed microprocessor that conducts the corresponding functions. This makes it evident that the embodiment example of FIG. 2 demands greater computer power, since one and the same microprocessor must perform two functions, i.e. the evaluation by positive and by negative edges, as much as possible in real time. In the embodiment example of FIG. 1, by contrast, the microprocessor need perform only one of the two functions of the evaluation logic units 7 or 8 in series.

Figure 3:
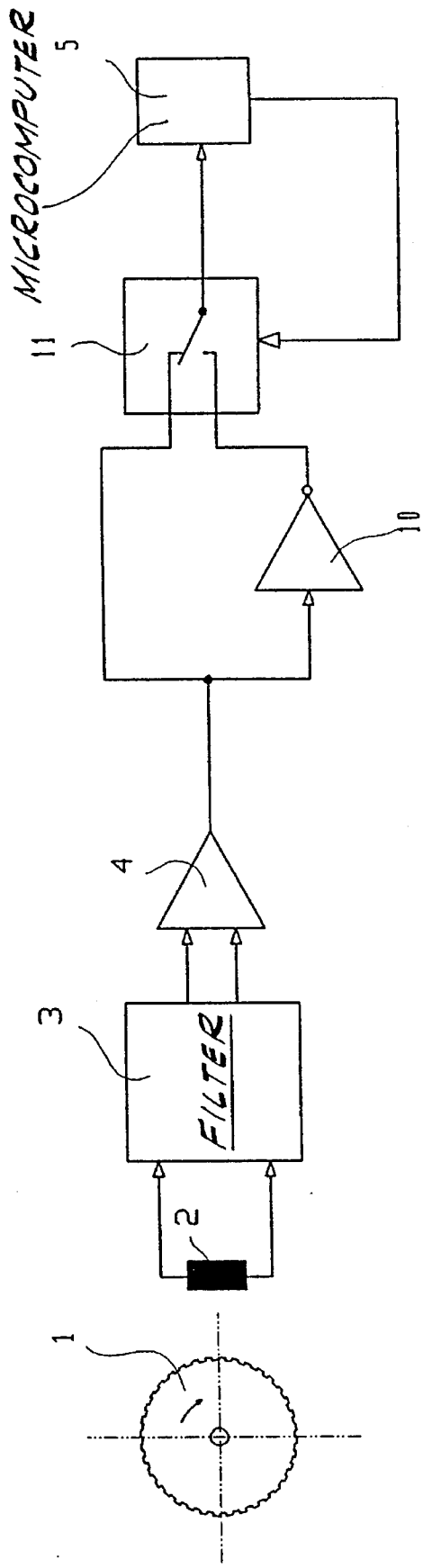
FIG. 3: schematic circuit diagram of a device for detecting rotational speed according to a third embodiment example of the invention.

The embodiment example of FIG. 3 corresponds in this respect in principle to that of FIG. 1, in which the positive or negative edges are evaluated in series.

The output of comparator 4 is connected to microcomputer 5 either directly or by way of an inverter 10, depending on the position of a switch 11. Microcomputer 5 evaluates only one type of edges, that is, positive or negative edges of the comparator signal, and contains functionally, in the terms of FIGS. 1 or 2, only one of the two evaluation logic units 7 and 8 and the rotational speed calculation logic unit 9. Differently from the embodiment example of FIG. 1, however, the changeover is done externally via the inverter 10. The microcomputer thus evaluates only one sort of edges. If the temporal intervals fluctuate by more than a predetermined amount, then the microcomputer 5 changes the switch 11 over, so that the inverted signal of the comparator is evaluated. As a result of this, the edges are also changed over, so that positive edges become negative edges and vice versa. Otherwise, the circuit of FIG. 3 operates with the same effect as that of FIG. 1. Here too, both operating modes are possible, namely, that switch 11 is changed over only if the errors exceed a predetermined value, or that the switch assumes both positions in succession and later maintains the position at which the better signal was obtained.

Figure 4:
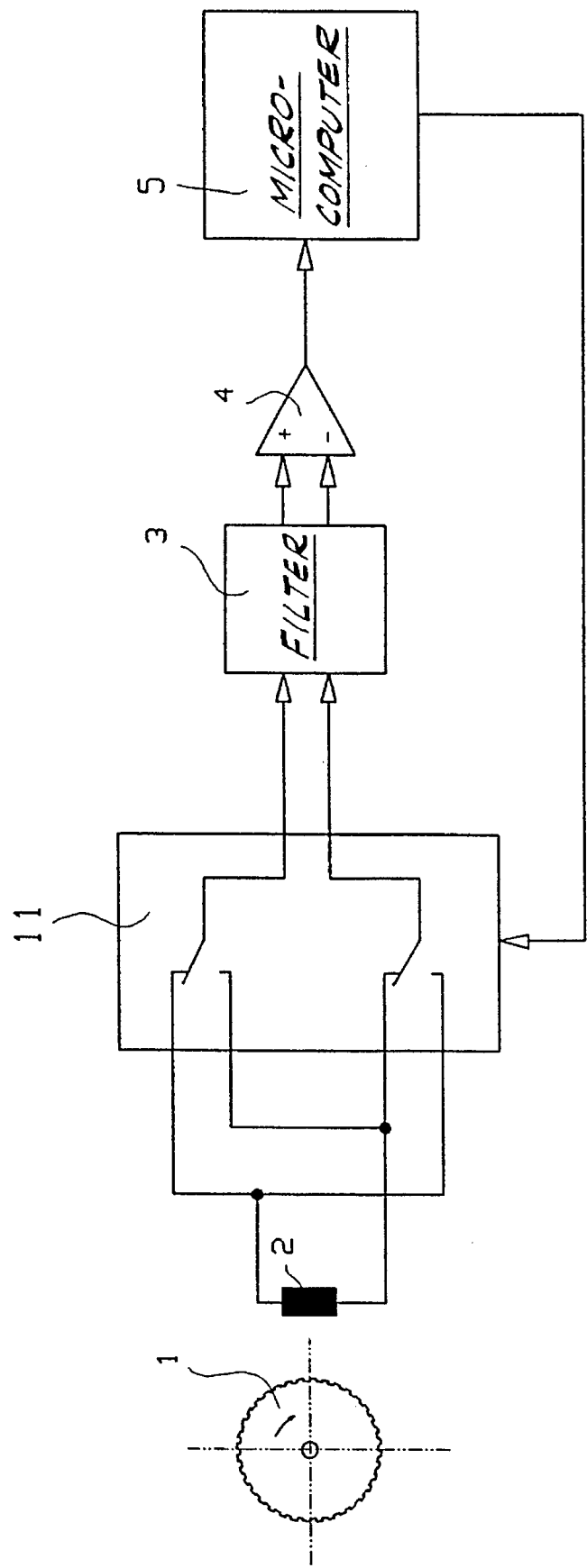
FIG. 4: schematic circuit diagram of a device for detecting rotational speed according to a fourth embodiment example of the invention.

The embodiment example of FIG. 4 operates in a manner functionally similar to that of FIG. 3. Here too, the microcomputer 5 evaluates only one type of edges. Instead of the inverter 10 of FIG. 3, however, it is provided here that the output signal, and thus the polarity of the inductive sensor 2, is changed over. For this purpose, a bipolar changeover switch 11 is provided, which is controlled by the microcomputer 5 and lies between the inductive sensor 2 and the filter 3. The polarity is alternated by changing over switch 11, which causes rising and falling edges at the comparator output to exchange their properties in regard to interference behavior. If the microcomputer 5 obtains a worse signal after the changing the polarity of the sensor, then the system switches back to the original polarity. Here too, of course, the other operating mode is also possible, in which both polarities are checked and the one is kept for which the better result is obtained.

In accordance with this invention it is significant that the basis for generating a rotating part speed signal can be changed once or several times during a full revolution of the magnet wheel. In particular, the decision whether to evaluate the positive or negative edges is made every time a given number of pulses is detected, this given number being smaller than the number of pulses received during a full revolution of the magnet wheel. For example, this decision can be made every 10 pulses in connection with a magnet wheel which generates 200 pulses per rev. Accordingly, during continual generation of a rotating part speed signal, the edges of the square-wave signal upon which the generated rotated part speed signal is based changes at least once, typically twice or more, for each full revolution of the magnet wheel.

An additional aspect of the invention is a memory, for example, associated with microprocessor 5, which stores information regarding for which teeth of the magnet wheel the positive edges should be evaluated and for which teeth of the magnet wheel the negative edges should be evaluated. Information is stored in the memory as to whether edges of the first type or edges of the second type should be evaluated for each group of teeth among the plurality of teeth on the magnet wheel. In operation, a magnet wheel has, for example, 200 teeth and the device detects that for teeth numbers 1 to 80 evaluation of the positive edges provides better results whereas for teeth numbers 81 to 200 evaluation of the negative edges provide better results. These numbers are stored in the memory and the device automatically changes from evaluation of the positive edges for teeth numbers 1–80 to evaluation of the negative edges for teeth numbers 81–200. This memory is functional in combination with either in-parallel or in-series modes of operation of the device described above.

In summary, the invention creates a process and a device for detecting rotational speed with an inductive sensor in which a sinusoidal potential is induced by a magnet wheel and then fed to a filter with a comparator connected downstream of the filter and therefrom into a square-wave signal that is essentially proportional to the rotational speed of the magnet wheel. This output signal of the comparator is evaluated in a microcomputer. In this evaluation, only the same type of edges of the comparator signal is evaluated, specifically those in which the intervals fluctuate less when considered over a certain time span. The microcomputer here can initially evaluate both types of edges, that is, positive and negative edges, and then use those edges in which smaller fluctuations, that is, interference, are determined for calculating the rotational speed. The microcomputer can also first evaluate only one type of edges and change over to edges of the other type if the former displays interference above a present value. If the edges of the other type show even greater interference than those of the first type, then the system switches back to the first type. The changeover can be done either in the microcomputer or externally. The external changeover to the type of edge can be done by an external inverter or by reversing the polarity of the sensor output signals by means of a controllable switch.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A process for detecting the rotational speed of a rotating part comprising:

sensing a magnet wheel connected to the rotating part with a sensor which produces an essentially sinusoidal output signal;

converting the sinusoidal output signal into a square-wave signal having first edges of a first type and second edges of a second type, each of said first edges being separated by temporal intervals within a time span and each of said second edges being separated by temporal intervals within said time span;

setting a predetermined fluctuation target value corresponding to an amount of temporal interval fluctuation; and generating a rotating part speed signal based on the edges of the square-wave signal of one type only of said first and second types, the edges upon which the rotating part speed signal is based having temporal intervals which fluctuate by less than the predetermined fluctuation target value during said time span.

2. The process of claim 1 wherein the edges of the square-wave signal upon which the generated rotated part speed signal is based changes at least twice for each full revolution of the magnet wheel.

3. The process of claim 1 wherein all edges of the square-wave signal are evaluated and the rotating part speed signal is based on those edges only of the same type for which the temporal intervals have smaller fluctuations during an edge-type evaluation time period as compared to fluctuations of the other type of edges.

4. The process of claim 1 comprising setting a first predetermined fluctuation target value for said first type of edges and a second predetermined fluctuation target value for said second type of edges, each of said fluctuation target values being changeable, said first fluctuation target value corresponding to the amount of fluctuation in temporal intervals of the second type of edges and said second fluctuation target value corresponding to the amount of fluctuation in temporal intervals of said first type of edges during an edge-type evaluation time period; and generating a rotating part speed signal based on the edges of the square-wave signal of one type only of said first and second types, the edges among the first and second types upon which the rotating part speed signal is based having temporal intervals which fluctuate by less than the predetermined first and second fluctuation target values, respectively, during said time span.

5. The process of claim 1 wherein the first edges of the first type, which are either positive edges or negative edges, are evaluated for generation of the rotating speed signal and edges for the second type opposite to the first type are evaluated only if the temporal intervals of the edges of the first type fluctuate during an edge-type evaluation time period by more than the fluctuation target value, and wherein the system switches back to evaluating edges of the first type if the temporal intervals of the second type of edges fluctuate more than those of the edges of the first type.

6. In a process for detecting the rotational speed of rotating parts, particularly vehicle wheels, in which a sensor senses a magnet wheel connected to the rotating part and produces an essentially sinusoidal output signal which is converted into a square-wave signal, the square-wave signal having first edges of a first type and second edges of a second type, each of said first edges being separated by temporal intervals within a time span and each of said second edges being separated by temporal intervals within said time span, with the square-wave signal being evaluated and a signal corresponding to the rotational speed to be determined being generated, the improvement in the process comprising determining the rotational speed using edges of only one of said first and second types from the square-wave signal, the edges upon which the rotating part speed signal is based having temporal intervals which fluctuate by less than a prescribed amount during a predetermined time span.

7. The process according to claim 6, characterized in that all edges of the square-wave signal are investigated and those edges of the same type for which the temporal intervals have smaller fluctuations during a preset time span than the opposite type of edges are evaluated for calculating the rotational speed.

8. The process according to claim 7 wherein the prescribed amount is changeable and corresponds to the amount of fluctuations in the temporal intervals of the opposite type of edges during a preset time span.

9. The process according to claim 6 wherein the edges of a same first type, that is, positive or negative edges, are evaluated, and edges of the opposite type to this are evaluated only if the temporal intervals of the edges of the same first type fluctuate during a preset time span by more than the prescribed amount, and wherein the system switches back to evaluating edges of the same first type if the temporal intervals of the opposite type of edges fluctuate more than those of the edges of the same first type.

10. In a device for detecting the rotational speed of rotating parts, particularly vehicle wheels, having a magnet wheel connected to the rotating part, a sensor sensing the magnet wheel and producing a sinusoidal output signal, a comparator in communication with the sinusoidal output signal produced by the sensor generates a square-wave output signal having a first type of edges and a second type of edges opposite to the first type of edges, and a microcomputer that evaluates the square-wave output signal of the comparator, the improvement comprising:

an evaluation logic unit for the microcomputer which detects temporal intervals between edges of the first type in the square-wave output signal from the comparator; and a changeover unit which feeds the second type of edges from the square-wave signal for evaluation if the temporal intervals of the first type of edges fluctuate during a predetermined time span by more than a predetermined amount.

11. The device according to claim 10 wherein the changeover unit changes over only if the temporal intervals of the currently evaluated edges of the same type fluctuate during a predetermined time span by more than a set predetermined amount.

12. The device according to claim 10 wherein the microcomputer has a first evaluation logic unit for edges of the same first type and a second evaluation logic unit for edges of the same second type opposite to the first type, and wherein the changeover unit has circuitry such that only one of the two evaluation logic units is taken into account by a subsequent rotational speed calculation logic unit.

13. A device for detecting the rotational speed of a rotating part, the device comprising:

a magnet wheel connected to the rotating part;

a sensor sensing the magnet wheel and producing a sinusoidal output signal;

a comparator in communication with the sinusoidal output signal produced by the sensor that generates a square-wave output signal having a first type of edges and a second type of edges opposite to the first type of edges;

a microcomputer that evaluates the square-wave output signal of the comparator;

an evaluation logic unit for the microcomputer which detects temporal intervals between edges of the first type in the square-wave output signal from the comparator; and a changeover unit which feeds the second type of edges from the square-wave signal to the microcomputer for evaluation if the temporal intervals of the first type of edges fluctuate during a predetermined time span by more than a fluctuation target value.

14. The device according to claim 13 wherein the changeover unit changes over only if the temporal intervals of the second type of edges fluctuate during a predetermined time span by less than the fluctuation target value.

15. The device according to claim 13 wherein the microcomputer has a first evaluation logic unit for edges of the first type, a second evaluation logic unit for edges of the second type opposite to the first type, and a rotational speed calculation logic unit; and wherein the changeover unit has circuitry such that only a signal from one of the first or second evaluation logic units is evaluated by said rotational speed calculation logic unit.

16. The device according to claim 15 wherein the changeover unit feeds the output signal of the comparator alternatively to only one of the two evaluation logic units.

17. The device according to claim 15 wherein both of said evaluation logic units are constantly connected to the output of the comparator and wherein the changeover unit only connects one of the two evaluation logic units to the rotational speed calculation logic unit.

18. The device of claim 13 wherein the microcomputer only evaluates one type of edges of the square-wave output signal of the comparator and wherein the changeover unit connects the output of the comparator to the microcomputer either directly or via an inverter.

19. The device of claim 15 wherein the changeover unit is constructed as a bipolar pole reversal switch connected directly downstream of the sensor, and wherein the microcomputer only evaluates one type of edges, such that by changing over the changeover unit, and thereby switching the polarity of the output signal of the sensor, the edges to be evaluated are also exchanged.

20. The device according to claim 19 wherein the microcomputer drives the changeover unit such that, during a first time span, the same type of edges of a single type are fed to the microcomputer, wherein the microcomputer subsequently sets the changeover unit into its other operating position for a second time span, so that edges opposite to the edges evaluated during the first time span are evaluated, and wherein the microcomputer subsequently sets the changeover unit into that position in which the temporal intervals of the respective same type of edges show the least fluctuation.

21. The device accordingly to claim 13 wherein the magnet wheel comprises a plurality of teeth consisting of one or more groups of teeth, the device further comprising a memory for storing information as to whether edges of the first type or edges of the second type should be evaluated for each of said groups of teeth.

22. The process of claim 6 wherein the sinusoidal output signal is filtered before being converted into a square-wave signal.

* * * * *